UNITED STATES PATENT OFFICE.

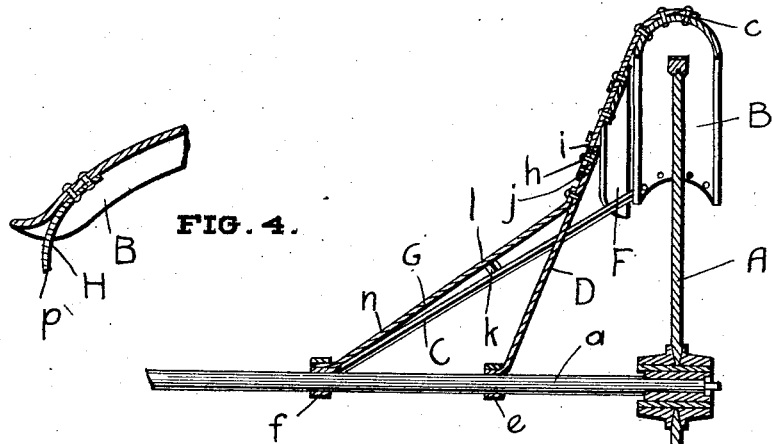
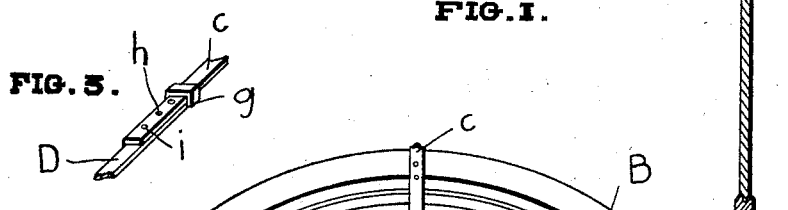
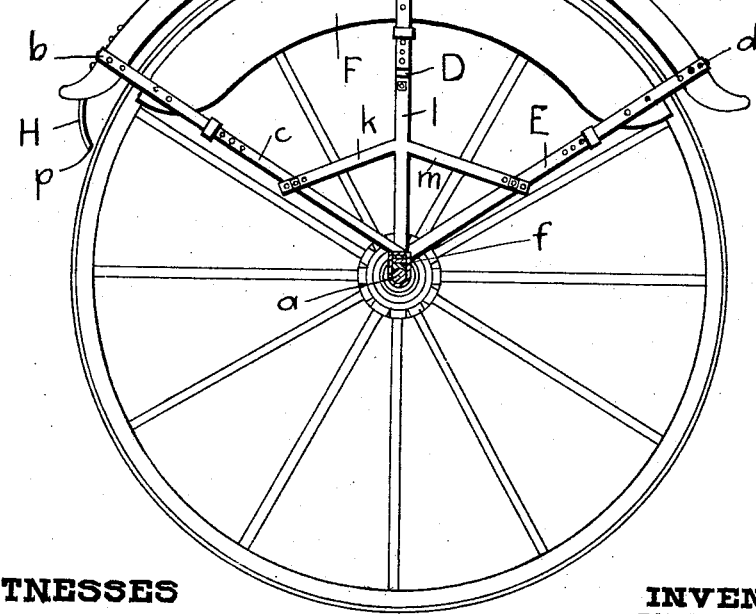

WILLIAM TERRENCE McCAULEY, OF OSGOODE, ONTARIO, CANADA.

MUD-GUARD FOR VEHICLES.

No. 857,747.          Specification of Letters Patent.          Patented June 25, 1907.

Application filed November 22, 1906. Serial No. 344,655.

*To all whom it may concern:*

Be it known that I, WILLIAM TERRENCE McCAULEY, of Osgoode, in the county of Russell, Province of Ontario, Canada, have invented certain new and useful Improvements in Mud-Guards for Vehicles, of which the following is a specification.

My invention relates to improvements in mud guards for vehicles, and the objects of my invention are to provide a cheap and simple form of mud guard which may be readily attached to vehicle wheels supported wholly from the axle thereof and which may be adjusted in position thereon; and it consists essentially of a guard semi-circular in cross-section extending partially around the wheel, a shield at the side of the wheel, a plurality of braces adjustably connected to the guard and shield and supporting the same from the axle of the wheel, the various details of the device being more fully set forth and described in the accompanying specifications and drawings.

Figure 1 shows a vertical sectional view of a vehicle wheel and axle having my improved mud guard attached thereto. Fig. 2 shows an end view of the same with a portion thereof in section. Fig. 3 is a perspective detail of the adjustable connection between the braces and the straps. Fig. 4 is a sectional detail of the mud scraper employed in combination with my mud guard.

In the drawing like figures of reference indicate corresponding parts in each figure.

Referring to the drawings:—A is the vehicle wheel of the usual construction, and $a$ is the axle supporting the same.

B is the shield or guard which is made semi-circular in cross-section, extending partially around the periphery of the wheel at a distance of a few inches therefrom. The guard B, has secured thereto by riveting or other suitable means a plurality of metal straps $b$, $c$ and $d$ the ends of which are adjustably connected to the braces C, D and E. In the embodiment illustrated, these braces are three in number, the lower end of the center one being connected to a band or clip $e$, on the axle. Preferably this clip is the ordinary clip found in this position on most vehicles. The two outer braces C and E are connected to a second clip $f$, located at a distance farther in on the axle. This clip is also found on most vehicles in the position indicated.

The adjustable connection between the braces and the straps may be formed by any suitable means that I have shown comprising straps $g$ integral with the ends of the braces and which encircles the straps any relative movement between the straps and braces being prevented by a bolt $h$, which extends through two of a series of holes $i$ and $j$ provided in the brace and strap. By the provision of a suitable number of holes any desirable degree of adjustability may be secured. On the inside of the wheel a second shield F is secured by suitable means to the straps $b$, $c$ and $d$ and is adapted to prevent the mud carried on the spokes from splashing against the vehicle body. To give additional rigidity to the braces, I provide an auxiliary brace G, which as shown is made star-shaped having three arms thereof connected to the three braces C, D and E and having the fourth arm connected to the inner clip. The three arms $k$, $l$ and $m$ are adjustably connected to the braces preferably by means of bolts passing through holes provided in the ends of the said arms.

To provide for the removal of excessive mud from the wheel, I provide a scraper or cutter H, preferably as shown bolted to the strap at the rear end of the mud guard. This scraper may be of any construction that shown being in the form of a fixed arm having the lower end $p$ formed with a knife edge, located immediately above the tire of the wheel and adapted to cut and separate the mud collecting thereon, causing the same to fall off by its own weight.

It will thus be seen that I have devised an exceedingly cheap and simple form of mud guard which may be applied to any vehicle and which may be adjusted in position thereto. It is evident that such a device will be of great value to any type of ordinary vehicle as it will prevent the mud being thrown on to any part of the carriage. The fact that the supporting braces for the guard are all on the inside of the wheel render them very inconspicuous, and the guard being supported from the axle has not communicated to it the uneven movement of the vehicle body.

While I have only shown the device as attached to one wheel it will be understood that it will be attached to all the wheels on the vehicle.

While I have described with great particularity of detail one specific embodiment of my invention, yet it is not to be understood that the invention is limited thereto, as changes might be made in detail without materially departing from the spirit of my invention.

What I claim as my invention is:—

1. In a vehicle mud guard the combination with the wheel, axle, and two clips thereof, of a mud guard extending partially around the wheel, a brace connected to the outer clip and to the center of the mud guard, two braces connected to the inner clip and to the extremities of the mud guard, a third star shaped brace having the arms thereof connected respectively to the three braces and to the innermost clip as and for the purpose specified.

2. In a vehicle mud guard, the combination with the wheel, axle and two clips thereof, of a mud guard semi-circular in cross-section extending partially around the wheel, straps secured thereto at the center and extremities, a brace adjustably connected to the center strap and to the outer clip, two braces adjustably connected to the straps at the extremities of the guard and to the inner clip, a side guard secured to the straps, and a star-shaped brace connecting the three braces and the inner clip substantially as described.

Signed at Ottawa, in the county of Carleton, and Province of Ontario, Canada, this 3rd day of November, 1906.

WILLIAM TERRENCE McCAULEY.

Witnesses:
RUSSEL S. SMART,
WM. A. WYMAN.